United States Patent [19]

Tanaka

[11] Patent Number: 5,249,296
[45] Date of Patent: Sep. 28, 1993

[54] INFORMATION PROCESSING APPARATUS FOR CONTROLLING WINDOW POSITIONS

[75] Inventor: Hidekazu Tanaka, Tokyo, Japan
[73] Assignee: Sony Corporation, Tokyo, Japan
[21] Appl. No.: 877,854
[22] Filed: May 4, 1992
[30] Foreign Application Priority Data
   May 9, 1991 [JP] Japan .................. 3-133442
[51] Int. Cl.$^5$ .................. G09G 1/100; G09G 5/32
[52] U.S. Cl. .................. 395/700; 364/DIG. 2;
   364/927.2; 364/927.6; 364/927.63; 364/927.64
[58] Field of Search .................. 395/700

[56] References Cited

U.S. PATENT DOCUMENTS 4,899,136 2/1990 Beard et al. .................. 340/706

FOREIGN PATENT DOCUMENTS

0457990A2 11/1991 European Pat. Off.
WO89/11694 11/1989 PCT Int'l Appl.

*Primary Examiner*—Gareth D. Shaw
*Assistant Examiner*—A. Katbab
*Attorney, Agent, or Firm*—Limbach & Limbach

[57] ABSTRACT

An information processing apparatus for controlling window positions comprising a pen for inputting coordinate information, a tablet for generating coordinate data based on coordinate information input by the pen onto the tablet, a display placed under the tablet in such a manner that an image on the display is visible through the tablet means, and first display control means for opening in a predetermined position a new window corresponding to the icon selected by a checking (pen down, pen up at a single icon location) operation of the pen. The apparatus also includes a second display control means for opening a new window in a desired position outside the icon area selected by a dragging operation of the pen, the dragging operation being executed by three actions. First, the pen is put down onto the icon in the icon area of the display means, the pen is dragged together with the icon to a desired position outside the icon area, and the pen is then lifted off the tablet.

3 Claims, 9 Drawing Sheets

INFORMATION PROCESSING APPARATUS FOR CONTROLLING WINDOW POSITIONS

BACKGROUND OF THE INVENTION

1. Field of the Invention

The present invention relates to an information processing apparatus for controlling window positions, the apparatus allowing the window corresponding to a selected icon on a display screen to be opened in the position in which the icon is checked with a pointing device, or in the position to which the icon is dragged with the pointing device and from which the pointing device is lifted up.

2. Description of the Prior Art

Computers used to be given instructions only in computer language. Because those who were not versed in the arcane computer-oriented language had difficulty in operating computers, recent years have seen a growing number of computers that run under special window controlling apparatuses for user-friendly window control. These apparatuses permit almost anyone easy control of the computer through the use of displayed icons that represent necessary computer functions.

In operation, the window controlling apparatus allows the user to pick one of the icons displayed on the screen. When a given icon is selected, the window corresponding thereto appears on the screen. Window controlling apparatuses come in two types: one that permits the window corresponding to a selected icon to appear over the entire screen, and the other type having each icon-associated window displayed partially on the screen. The present invention proposes an information processing apparatus for controlling window positions which belongs to the latter type.

Traditionally, there are two ways to select an icon by use of a pointing device, illustratively a pen. One way is to "check" one of the displayed icons using the pointing pen. The checking action involves placing the pointing pen down to the icon position and then lifting up the pen therefrom. That is, the desired icon is apparently "pressed" for a short period of time. The other way to select the icon is to "drag" it. That is, the pointing pen is placed on the desired icon position and is moved as held down up to a new position where a new window is to be opened.

Conventional information processing apparatuses for controlling window positions adopt exclusively one of the two icon-selecting methods, "check" or "drag." It is theoretically possible to design an apparatus that would be switched to one of the two methods as desired. However, one disadvantage of that type of apparatus is that the switching must be accomplished before the apparatus is activated. For the majority of the prior art apparatuses that rely on one of the two methods, operations carried out according to the other unadopted method are regarded as errors and all inputs intended thereby are thus rejected.

In this connection, there are also proposed information processing systems that control entry of and changes to various kinds of personal information, such as electronic address books and electronic telephone directory and schedule table devices known as organizers. Such systems are disclosed in U.S. patent application Ser. No. 621,898 having a common assignee and in the present assignee's Japanese Patent Application No. 2 (1990)-84318.

With such information processing systems, a display screen H shown in FIG. 1 is switched according to the user's selecting operation. Referring to FIG. 1, icons 1A, 1B, etc. are displayed in the upper and right hand margins of the screen H. In operation, the user puts a pointing pen, not shown, down to one of the icons (1A, 1B, etc.) on the screen and drags the pen to a suitable position thereon. This causes a window W corresponding to the selected icon to appear in the position from which the pen is lifted up. Indications in the window let the user proceed to control such personal information as schedules.

Given this kind of information processing system, the user may wish to change the display position of the window W as desired. The user may also wish to store the displayed window W.

If the user wishes to store the displayed window W, the user puts the pointing pen down to a predetermined area ARM of the window W and drags the pen to a display area ARST (FIG. 1). When the pointing pen is lifted up from the corresponding icon in the display area ARST, the window W is stored.

If the pointing pen is dragged inside an area ARDP (display area for page data) on the display screen H and is held away from the area ARST, the window W is not stored but is moved to the position from which the pen is lifted up.

As described, the operations for controlling window positions on the screen of the above prior art systems are complicated, constrained and confusing.

SUMMARY OF THE INVENTION

It is therefore an object of the present invention to provide an information processing apparatus for controlling window positions, the apparatus allowing the user to employ any one of the two icon-selecting methods, "check" and "drag," to control window positions as desired on the screen.

In carrying out the invention and according to one aspect thereof, there is provided an information processing apparatus for controlling window positions comprising: (a) pen means for inputting coordinate information; (b) tablet means for generating coordinate data based on the coordinate information input by the pen means onto the tablet means; (c) display means placed under the tablet means in such a manner that an image displayed on the display means is visible through the tablet means; (d) first display control means for opening in a predetermined position a new window corresponding to the icon selected by a checking operation of the pen means, the checking operation being executed by two actions, the first action involving putting the pen means down onto the icon in an icon area displayed on the display means, the second action involving lifting up the pen means from the icon within the icon area, the executing of the checking operation being detected based on the coordinate data generated by the tablet means; and (e) second display control means for opening in a desired position outside the icon area a new window corresponding to the icon selected by a dragging operation of the pen means, the dragging operation being executed by three actions, the first action involving putting the pen means down onto the icon in the icon area displayed on the display means, the second action involving dragging the pen means together with the icon up to the desired position outside the icon area, the third action involving lifting up the pen means from the icon outside the icon area, the executing of the dragging operation being detected based on the coordinate data generated by the tablet means.

In operation, the inventive information processing apparatus for controlling window positions opens a new window in one of two ways. When an icon is checked with the pointing pen attached to the apparatus, the apparatus opens a new window in a predetermined position (e.g., the position where the old window was previously being opened). When an icon is dragged with the pointing pen, the apparatus opens a new window in the position to which the icon is dragged and from which the pointing pen is lifted up.

Further objects, features and advantages of this invention will become more apparent upon a reading of the following description and appended drawings.

DESCRIPTION OF THE PREFERRED EMBODIMENT

Figure 1:
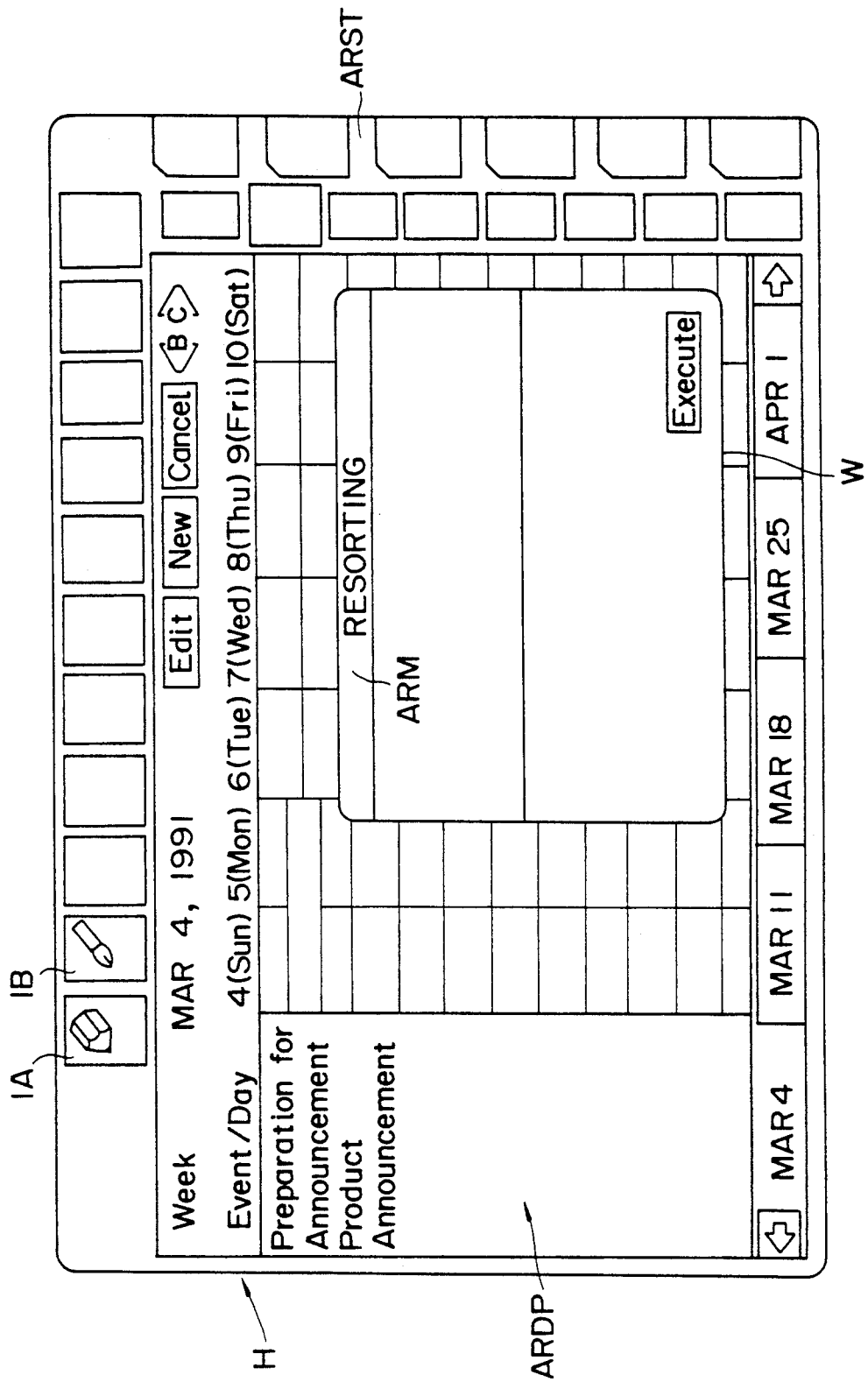
FIG. 1 is a view of a typical screen of a prior art information processing apparatus for controlling window positions.
Figure 2:
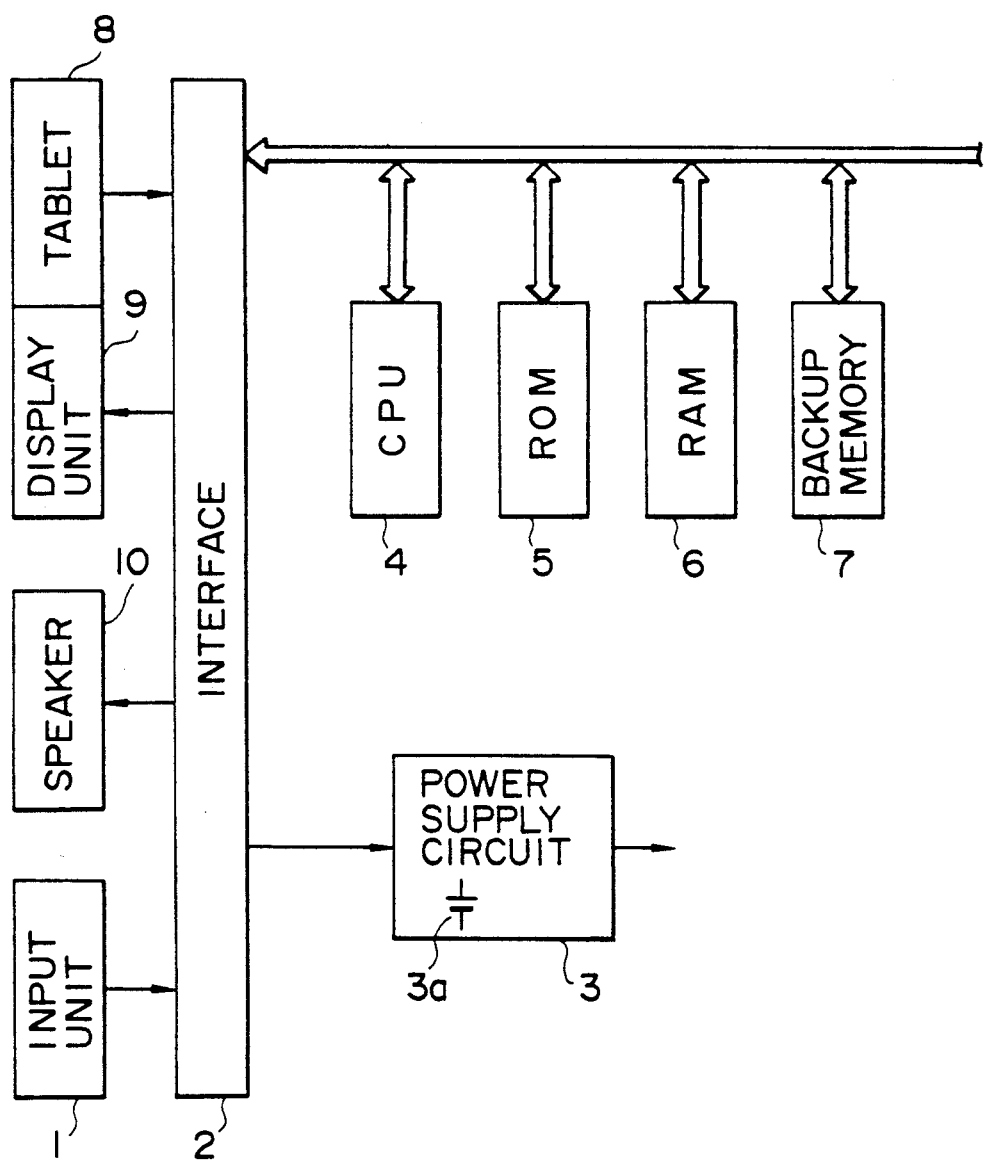
FIG. 2 is a block diagram showing the construction of a computer-operated device embodying the invention.

FIG. 2 is a block diagram showing the construction of an electronic "organizer" notebook device to which the invention is illustratively applied. In FIG. 2, an input unit 1 incorporates various switches including a power switch. The signals corresponding to these switches are supplied to a CPU 4 via an interface 2. A DC voltage, obtained by rectifying an AC power source, is fed to a power supply circuit 3. The power supply circuit 3 contains a battery 3a inside. When the AC power source supplies the DC voltage through rectification, that voltage is used to power the components of the device; when the AC power source does not supply the DC voltage, the battery 3a takes over and powers the device components.

The interface 2 has a tablet 8, a display unit 9 and a speaker 10 connected thereto. The interface 2 is also connected via a bus line with the CPU 4, a ROM 5, a RAM 6 and a backup memory 7.

The tablet 8 is made of a transparent touch electrode attached to the display surface of the display unit 9. The icons such as buttons displayed on the display unit 9 are used as input buttons of the tablet 8. When a user touches one of these icons visible through the transparent touch electrode, the coordinate signal defining the touched part is sent to the CPU 4 for necessary processing.

Touching a part of the tablet 8 generates the coordinate signal corresponding to the touched part. The signal may be generated by one of two methods. One method is a pressure sensitive method whereby the pointing pen when operated senses a mechanical pressure change that triggers the signal. The other method is an electrostatic capacity method whereby the pointing pen when operated senses a capacitance change that results in signal generation. Either method may be used.

Figure 3:
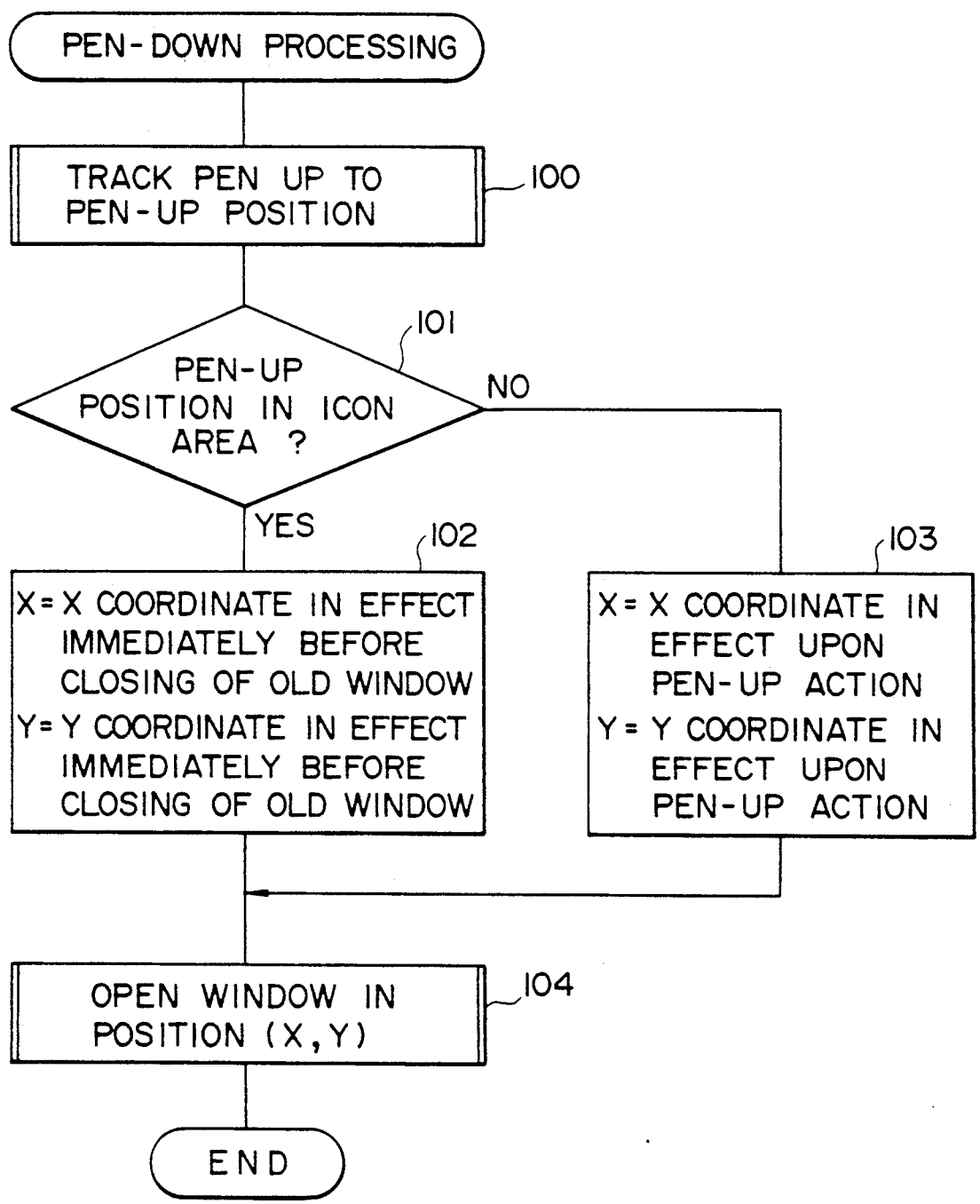
FIG. 3 is a flowchart showing how the embodiment of FIG. 2 works.
Figure 4:
FIG. 4 is a view of a typical screen displayed when power is applied to the embodiment.
Figure 5:
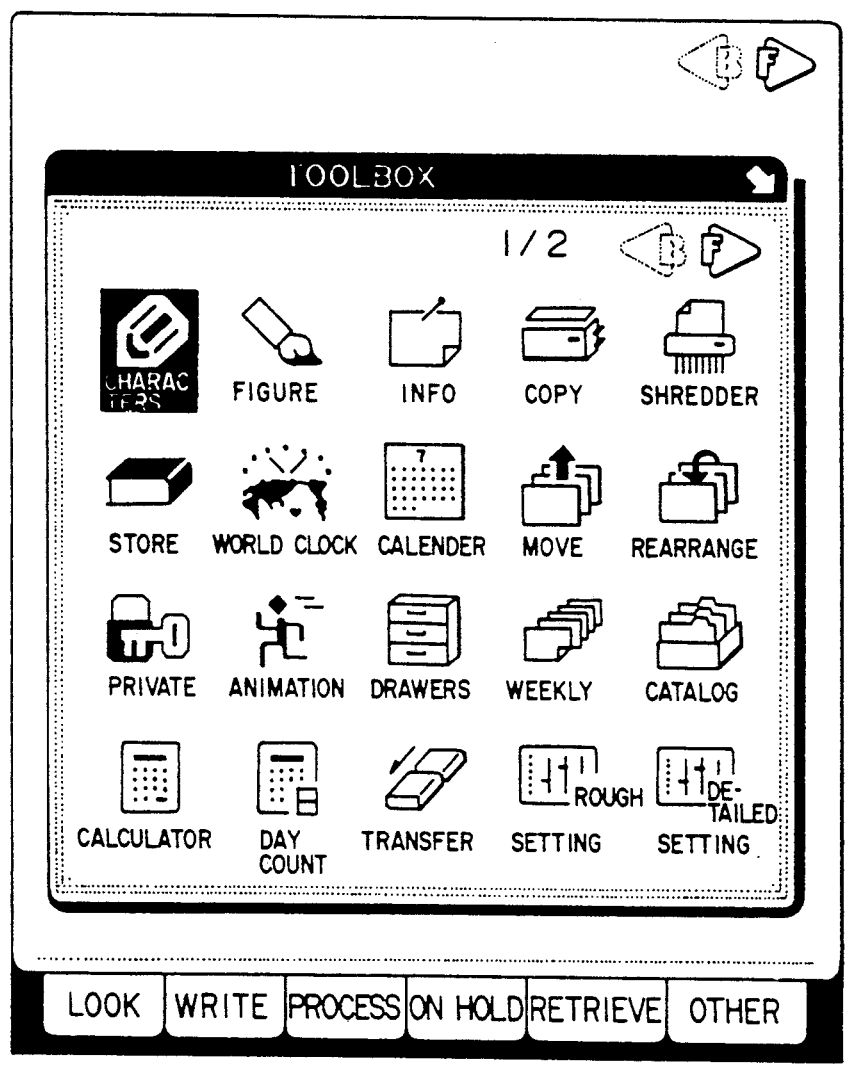
FIG. 5 is a view of a typical screen displayed when a 37 TOOLBOX" window is opened on the embodiment.

FIG. 3 is a flowchart depicting how the embodiment of FIG. 2 operates when the pointing pen is placed onto the screen. When the embodiment is powered, the display screen of FIG. 4 appears on the display unit 9. When an icon "TOOLBOX" is selected in a suitable mode, the "TOOLBOX" window of FIG. 5 is displayed. This window contains various icons. To input, say, characters, the user opens a character input window by selecting an icon "CHARACTERS."

The "CHARACTERS" icon is selected by first placing the pointing pen down to that icon and then lifting up the pen therefrom. The pen-down action selects the icon, and the pen-up action determines the position in which the window corresponding to the selected icon is to be opened. The processing following the pen-up action takes place as follows.

Step 100 of FIG. 3 performs necessary processing between pen-down action and pen-up action. Details of this processing will be described later with reference to the flowchart of FIG. 7. Suppose now that the pointing pen is lifted up from a particular position and that the coordinates of that position are detected. Then step 101 is reached. In step 101, a check is made to see if the coordinates of the pen-up position represent an icon area. The icon area is a screen area in which various icons, such as those in FIG. 5, are displayed. In FIG. 5, the "CHARACTERS" icon is displayed in reverse video. The reverse video display is executed upon pen-down action.

As described earlier, there are two ways to open a window: either to "check" the necessary icon with the pointing pen by putting the pen down to the icon and then lifting up the pen therefrom; or to "drag" the pen together with the selected icon as the pen is held down onto the tablet, the icon being released by lifting up the pen when a desired position is reached. When the icon is "checked," a new window is allowed to open in a predetermined position (with this embodiment, the position where the old window was previously being opened); when the icon is "dragged," a new window opens in the position where the pointing pen after dragging operation is lifted up.

Suppose that the coordinates detected in the pen-up position are generated by a checking operation. In that case, the pen-down position is located in the same icon area as the pen-down position. Thus step 101 yields the affirmative decision, i.e., the decision that the coordinates of the pen-up position are within the icon area. The affirmative decision in step 101 is followed by step 102. In step 102, the X and Y coordinate values of the position in which to open the new window are set respectively to the X and Y coordinate values in effect immediately before the old window was closed (function of first display control means).

Figure 6:
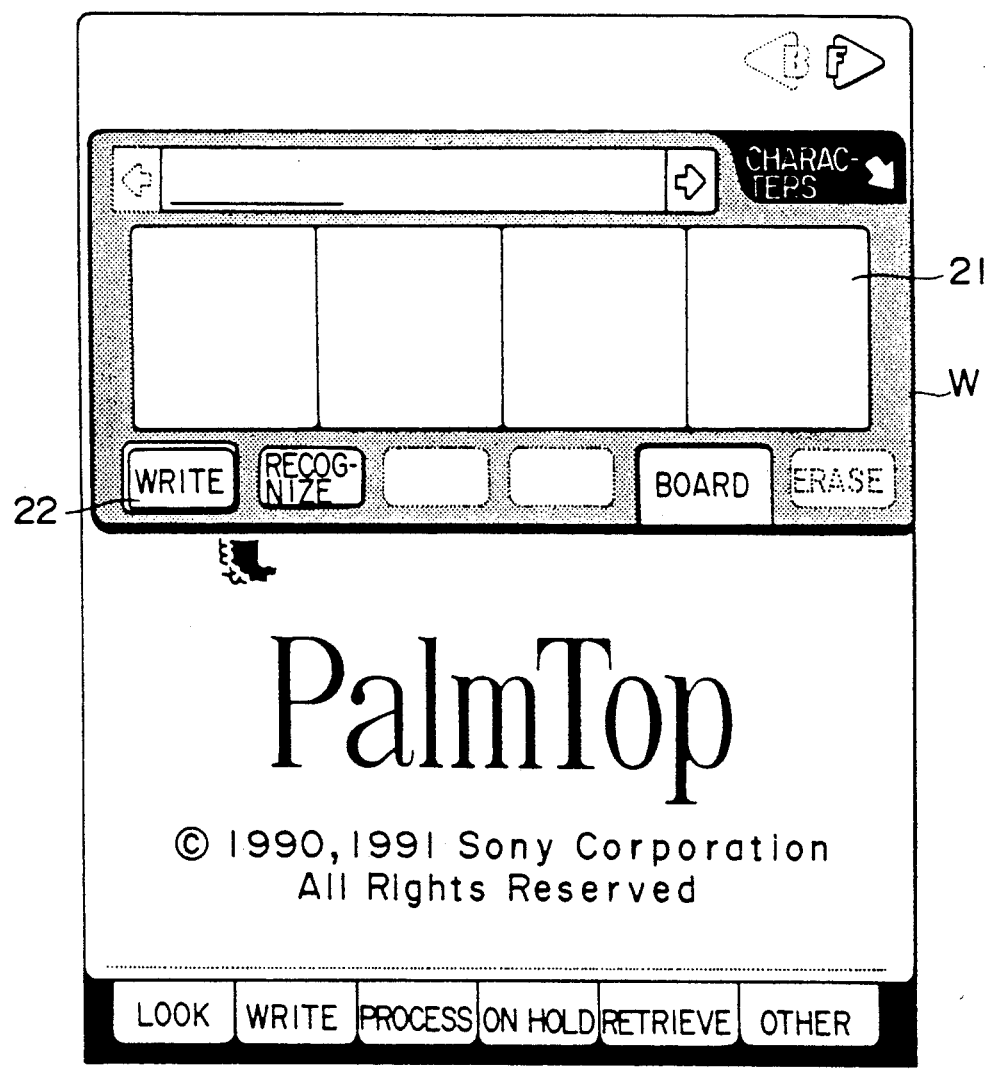
FIG. 6 is a view of a typical screen displayed when another window is opened on the embodiment.

In step 104, a character input window (character plate W) shown in FIG. 6 is opened. The display position of this window is set so as to conform to the X and Y coordinates established in step 102. That is, the character plate W is again opened in the position where the preceding character plate W was being opened.

Steps 102 and 104 constitute the first display control means for opening, when an icon is checked, the corresponding new window in the position in which the old window was being opened.

When the coordinates of the pen-up position are detected following a dragging operation, the pen-up position is located outside the icon area. In that case, step 101 finds that the coordinates of the pen-up position are not included in the icon area. The negative decision of step 101 is followed by step 103. In step 103, the X and Y coordinate values of the position in which to open the new window are set respectively to the X and Y coordinate values of the pen-up position (function of second display control means).

Then in the same manner as with the checking operation, step 104 opens the new window in the position defined by the X and Y coordinate values. The dragging operation opens a window in the position where the pointing pen is lifted up. That is, a window may be opened anywhere on the screen.

Steps 103 and 104 constitute the second display control means for opening a new window in the position to which an icon is dragged with the pointing pen and from which the pointing pen is lifted up.

Figure 7:
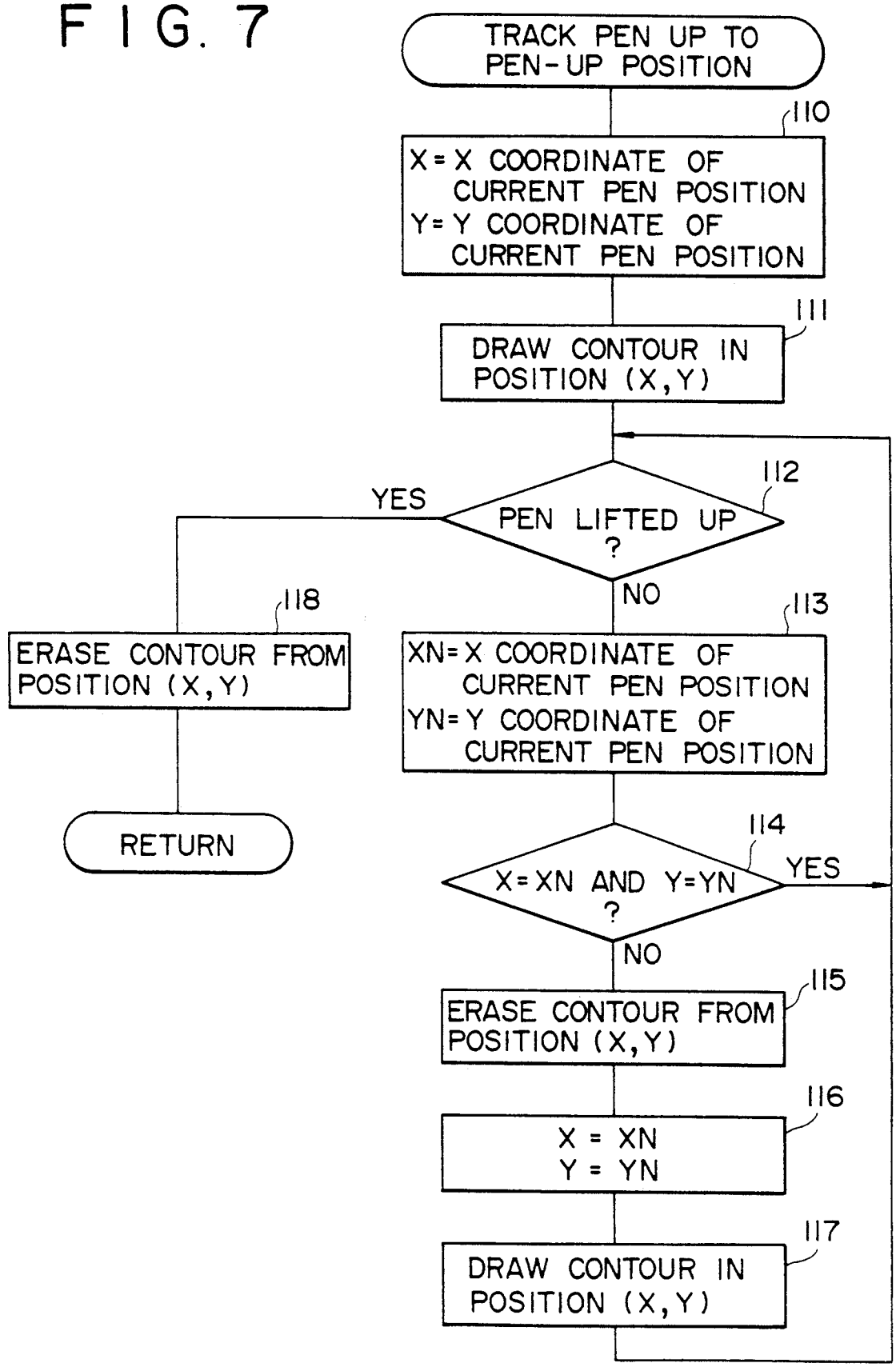
FIG. 7 is a flowchart describing the steps carried out between pen-down operation and pen-up operation on the embodiment.

FIG. 7 is a flowchart depicting the processing in effect up to a pen-up operation. When the pointing pen is placed down to a given position on the screen, the X and Y coordinate values of that pen-down position are retained respectively as X and Y in step 110. In step 111, a contour defining a predetermined range (i.e., icon contour) is drawn in the position designated by the X and Y coordinate values retained.

Step 112 checks to see if the pointing pen is lifted up. If the pen is found to be up, step 118 is reached. In step 118, the contour drawn in step 111 is erased and control is returned to the routine of FIG. 3. This means that a checking operation has been executed, with the coordinates of the pen-down position detected and the pen lifted up immediately thereafter.

Where a dragging operation is carried out, step 111 in which the contour was drawn is followed by step 112. Step 112 finds that the pointing pen is not lifted up. That is, the pen is moved as pressed against the tablet 8. Then step 112 is followed by step 113. In step 113, the X and Y coordinate values of the current pen position are stored respectively as new coordinate values XN and YN. Step 114 checks to see if the coordinates of the pointing pen are the same as the newly stored coordinates XN and YN. If they are the same, step 112 is reached again in which a check is made to see if the pointing pen is lifted up. The values XN and YN are not updated while the pen movement is being halted on the screen. As long as the pointing pen remains stationary, steps 112 through 114 are repeated.

When the pointing pen is moved (i.e., dragged) over the screen, step 114 finds the coordinates thereof to be new and thus different from XN and YN. In that case, step 114 is followed by step 115 in which the contour defined by the X and Y coordinate values and drawn in step 111 is erased. In step 116, the values XN and YN are stored as the coordinate values X and Y for displaying a new contour. In step 117, the new contour is drawn as per the stored coordinate values X and Y. Step 117 is followed by step 112.

Figure 8:
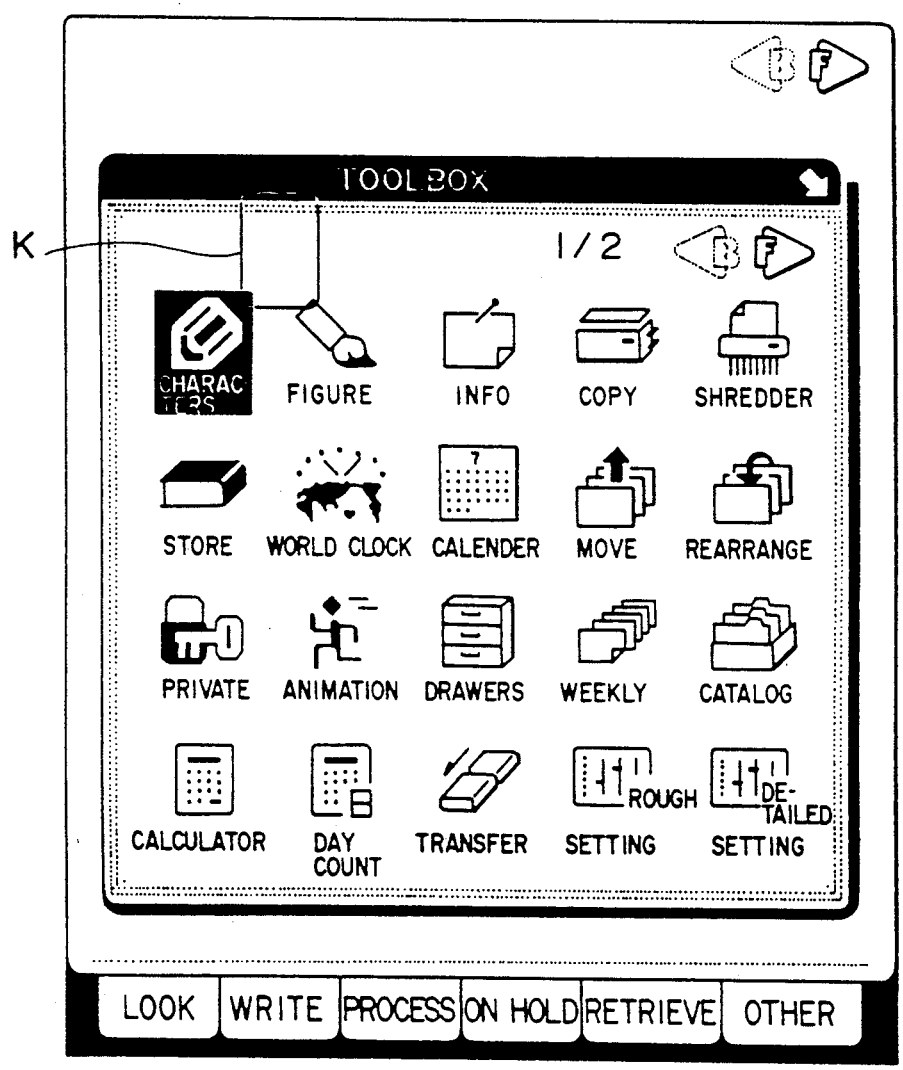
FIG. 8 is a view of a screen state that contains a contour indicating the position in which to open a window following a dragging operation on the embodiment.
Figure 9:
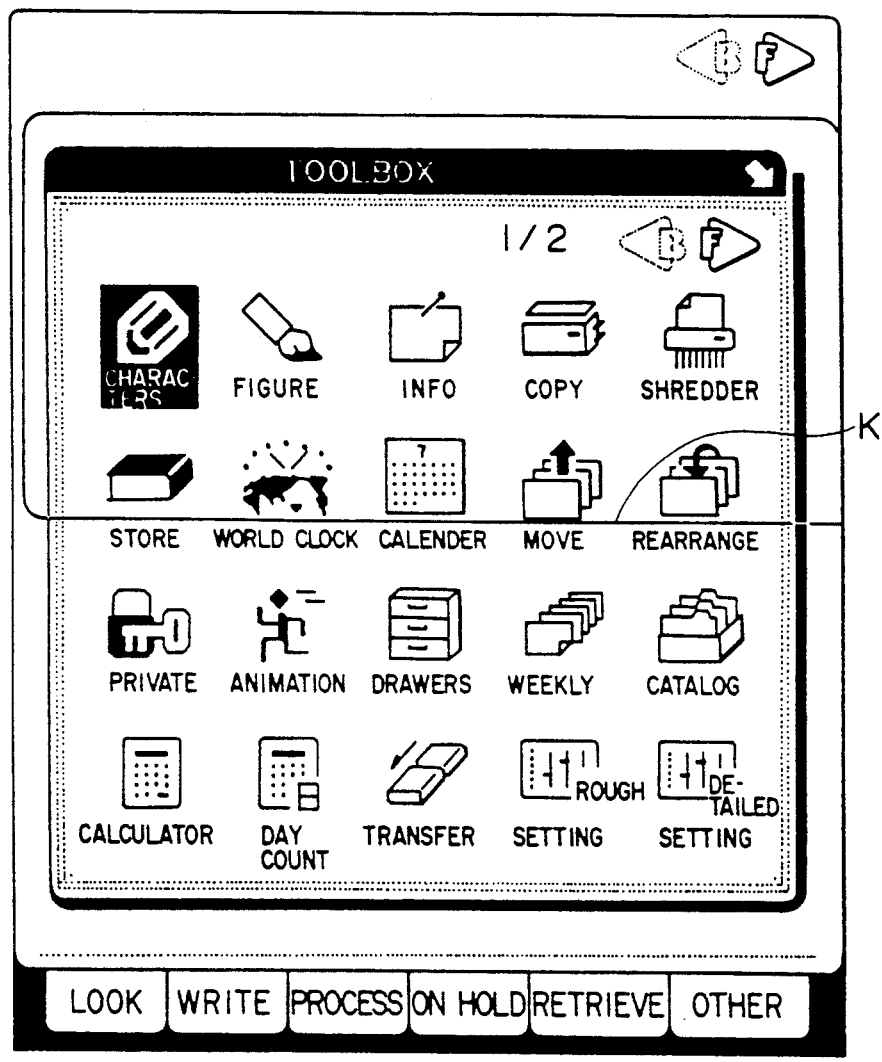
FIG. 9 is a view of another screen state that includes a contour indicating the position in which to open a window following a dragging operation on the embodiment.

As described, a dragging operation (i.e., pointing pen movement) causes the contour K drawn in step 117 to move over the screen "dragged" by the pen, as shown in FIGS. 8 and 9. The contour drawn at this point indicates the position in which to open a new window. If the pointing pen is not moved far enough to go out of the icon area, the contour K is displayed in small size (the same in size as the "CHARACTERS" icon), as illustrated in FIG. 8. If the pointing pen is moved out of the icon area, the contour K is displayed in large size (the same in size as the character plate W), as depicted in FIG. 9.

If the pointing pen still remains put down on the screen surface when control is returned to step 112, step 113 and subsequent steps are carried out. If there is no pointing pen movement, step 114 finds that the stored coordinate values remain the same. This returns control to step 112. If the pointing pen is dragged, step 114 finds the coordinates thereof to be new. This leads to step 115 in which the contour being displayed is erased. In step 117, a new contour is drawn in the position to which the pointing pen is dragged.

While the pointing pen remains stationary, the contour K also stays put. When the pointing pen is dragged over the screen surface, the contour K is moved along with the pen. At a later time, the pointing pen is lifted up. The pen-up operation is then detected in step 112, which is followed by step 118. Step 118 erases the currently displayed contour K, and control is returned to step 101 in FIG. 3.

Step 101 in FIG. 3, when reached from step 118, is followed by the subsequent steps that open the window W as shown in FIG. 6. As described earlier, the checking operation of the pointing pen establishes the previous window position as the position in which this window is opened; the dragging operation of the pen sets up the pen-up position as the window opening position.

While the pointing pen together with an icon is being dragged (in pen-down state), the corresponding window is not displayed. Instead, the contour K of the window is displayed in the position in which the window is to be opened, as illustrated in FIG. 9. This is because it takes some time to display the entire window and because it is temporally difficult to move the entire window along with the pen as the latter is being dragged at high speed. Alone, the window contour may be moved at high speed following the pointing pen being dragged.

When a character is hand-written in a square 21 of the character plate W in FIG. 6, the strokes are recognized as a pattern, and the recognized character is displayed in that square. When a WRITE button 22 is touched with the pointing pen, the character in the square 21 is written into a suitable position.

As described, the information processing apparatus for controlling window positions according to the invention opens a window in a predetermined position when an icon is checked with the pointing pen, or in the position to which the icon is dragged and from which the pointing pen is lifted up. This allows users to select icons by any pen-based input method. There is no need to switch between different pen-based input methods before or halfway through operation. This enhances the operability of the computer system in which the inventive apparatus is incorporated. When different users accustomed to different pen-based input methods operate the computer system, prior art apparatuses would accept some pen operations, reject some pen operations as errors or system failure, and demand repeated operations until the appropriate pen-based input method is complied with. Unlike its prior art counterparts, the inventive apparatus accepts all kinds of pen operations and saves the user a significant amount of operating chores.

While a preferred embodiment of the invention has been described using specific terms, such description is for illustrative purposes only, and it is to be understood that changes and variations may be made without departing from the spirit or scope of the following claims.

What is claimed is:

1. An information processing apparatus for controlling window positions comprising:
   (a) pen means for inputting coordinate information;
   (b) tablet means for generating coordinate data based on said coordinate information input by said pen means onto said tablet means;
   (c) display means placed under said tablet means in such a manner that an image displayed on said display means is visible through said tablet means;
   (d) first display control means for opening in a predetermined position a new window corresponding to an icon selected by a checking operation of said pen means, said checking operation being executed by two actions, the first action involving putting said pen means down onto said icon in an icon area displayed on said display means, the second action involving lifting up said pen means from said icon within said icon area, the executing of said checking operation being detected based on the coordinate data generated by said tablet means; and
   (e) second display control means for opening in a desired position outside said icon area a new window corresponding to an icon selected by a dragging operation of said pen means, said dragging operation being executed by three actions, the first action involving putting said pen means down onto said icon in said icon area displayed on said display means, the second action involving dragging said pen means together with said icon up to said desired position outside said icon area, the third action involving lifting up said pen means from said icon outside said icon area, the executing of said dragging operation being detected based on the coordinate data generated by said tablet means.

2. An information processing apparatus for controlling window positions according to claim 1, wherein said checking operation involves putting down said pen means onto said icon area and lifting up said pen means from said icon area without moving said pen means horizontally over said display means.

3. An information processing apparatus for controlling window positions according to claim 1, further comprising storage means for storing the coordinate data defining the position in which to open at least a previously opened window, wherein said checking operation opens a new window according to said coordinate data stored in said storage means, said new window being displayed in the position in which the previous window was opened.

* * * * *